US012737283B1

(12) United States Patent
Livingstone et al.

(10) Patent No.: US 12,737,283 B1
(45) Date of Patent: Sep. 15, 2026

(54) SYSTEM AND METHOD FOR AUTOMATED TESTING OF INTERACTION SUMMARY EVALUATION SYSTEM

(71) Applicant: Morgan Stanley Services Group Inc., New York, NY (US)

(72) Inventors: Vineta Livingstone, Iselin, NJ (US); Damola Olugboji, Monroe, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/213,065

(22) Filed: May 20, 2025

(51) Int. Cl.
*G06F 9/44* (2018.01)
*G06F 11/3668* (2025.01)
*G10L 13/08* (2013.01)
*H04N 7/15* (2006.01)

(52) U.S. Cl.
CPC .......... *G06F 11/3668* (2013.01); *G10L 13/08* (2013.01); *H04N 7/155* (2013.01)

(58) Field of Classification Search
CPC ...... G06F 11/3668; G10L 13/08; H04N 7/155
See application file for complete search history.

(56) References Cited

U.S. PATENT DOCUMENTS

| | | | |
|---|---|---|---|
| 6,205,412 B1 | 3/2001 | Barskiy et al. | |
| 11,095,774 B1 | 8/2021 | Willshire | |
| 12,149,655 B1 | 11/2024 | Phule | |
| 2004/0008825 A1 | 1/2004 | Seeley et al. | |
| 2006/0167970 A1 | 7/2006 | Seeley et al. | |
| 2008/0294482 A1* | 11/2008 | Bank | G06Q 10/06311 707/999.107 |
| 2011/0150189 A1 | 6/2011 | Kulkarni | |
| 2016/0212073 A1 | 7/2016 | Kulkarni et al. | |
| 2016/0219143 A1 | 7/2016 | Zilles et al. | |
| 2017/0264575 A1 | 9/2017 | Willshire | |
| 2019/0007550 A1 | 1/2019 | Kulkarni et al. | |

(Continued)

OTHER PUBLICATIONS

Cyara's Rest API:_Limitless Integration & Extensibility, 2023 https:/cyara.com/wp-content/uploads/2023/01/API-Datasheet-01062023.pdf, downloaded on Oct. 3, 2023.

(Continued)

*Primary Examiner* — Hang Pan
(74) *Attorney, Agent, or Firm* — PEARL COHEN LLP

(57) ABSTRACT

A system and method for testing an interaction evaluation system may execute a process to control an e-mail application, CRM application and/or a communications application, the communications application hosting one or more of audio and video communications; where the process is provide an audio stream to the communications application, the audio stream including a simulated conversation among a plurality of simulated participants. The process may cause the communications application to conduct a meeting or interaction and may cause an interaction evaluation system to provide a summary for the meeting or interaction. The process may evaluate the functioning of one or more of the e-mail application, CRM application and/or video communications application. A prompt control process may create and provide to an LLM (large language model) prompts to cause the LLM to create text output, and the text output may be provided to a text-to-speech process to produce the audio stream.

15 Claims, 4 Drawing Sheets

(56) References Cited

U.S. PATENT DOCUMENTS

| | | | | |
|---|---|---|---|---|
| 2020/0228476 | A1 | 7/2020 | Fejes et al. | |
| 2021/0174288 | A1* | 6/2021 | Gvildys | G10L 15/26 |
| 2022/0124057 | A1 | 4/2022 | Kulkarni et al. | |
| 2023/0057544 | A1* | 2/2023 | Seigneurbieux | H04L 65/80 |
| 2023/0112780 | A1 | 4/2023 | Rivas-Micoud | |
| 2023/0401146 | A1 | 12/2023 | Allen | |
| 2024/0039812 | A1* | 2/2024 | Hearn | H04L 43/50 |
| 2024/0223639 | A1* | 7/2024 | Jia | H04L 65/1069 |
| 2025/0104712 | A1* | 3/2025 | Lyu | G06F 40/30 |

OTHER PUBLICATIONS

Overview Developer Genesys, 2023, downloaded on Oct. 3, 2023, https:/developer.genesys.cloud/routing/conversations/.

* cited by examiner

SYSTEM AND METHOD FOR AUTOMATED TESTING OF INTERACTION SUMMARY EVALUATION SYSTEM

FIELD OF THE INVENTION

The present invention relates generally to test management of interaction systems such as e-mail and videoconferencing systems; for example for automating the text management of interaction systems and automatically generating data and controlling interaction components to be tested.

BACKGROUND

Platforms such as e-mail, telephone, and teleconferencing platforms may be used along with customer relationship management (CRM) software to manage and conduct interactions among people such as employees, agents or financial advisors (FAs) or other advisors, communicating with clients or customers. CRM software may include tools provided by Salesforce, Inc. to interact with a customer and to manage the interaction, e.g., maintaining customer records. Software tools may then summarize the interaction, e.g. as an e-mail to a client, and populate notes or other information regarding the interaction into CRM systems. For example, Morgan Stanley's Debrief tool may act as notetaker, summarizer and first draft communication composer for client interactions. Based on an interaction or meeting, such as a teleconference, Debrief may summarize key points discussed in the meeting, create an email or other document for an advisor to review, edit and send, and save notes into CRM software such as a Salesforce system.

These various components may be tested or validated. For example, a test interaction may be created including different communications between a simulated employee and simulated customer, and the components operating the interaction may be evaluated. Creating these simulated interactions may be a labor intensive process.

SUMMARY

A system and method for testing an interaction evaluation system may execute by a computer processor, a process to control an e-mail application, CRM application and/or a communications application, the communications application hosting one or more of audio and video communications; where the process is to provide or input an audio stream to the communications application, the audio stream including a simulated conversation among a plurality of simulated participants. The process may cause the communications application to conduct a meeting or interaction and may cause an interaction evaluation system to provide a summary for the meeting or interaction. The CRM system may receive a summary of the meeting from the interaction evaluation system. The process may evaluate the functioning of one or more of the e-mail application, CRM application and/or video communications application.

A prompt control process may create and provide to an LLM (large language model) prompts to cause the LLM to create text output, and the text output may be provided to a text-to-speech process to produce the audio stream.

Embodiments of the invention may create a test conversation between e.g. an artificial test agent or advisor, and an artificial test customer; create an artificial meeting between these artificial entities existing known software entities; and invoke and cause the meeting to take place between these entities with the test conversation. Embodiments may improve such technology by automatically creating and/or conducting simulated interactions, eliminating the need for manually producing and conducting such interactions.

BRIEF DESCRIPTION OF THE DRAWINGS

Non-limiting examples of embodiments of the disclosure are described below with reference to figures listed below. The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings.

Figure 1:
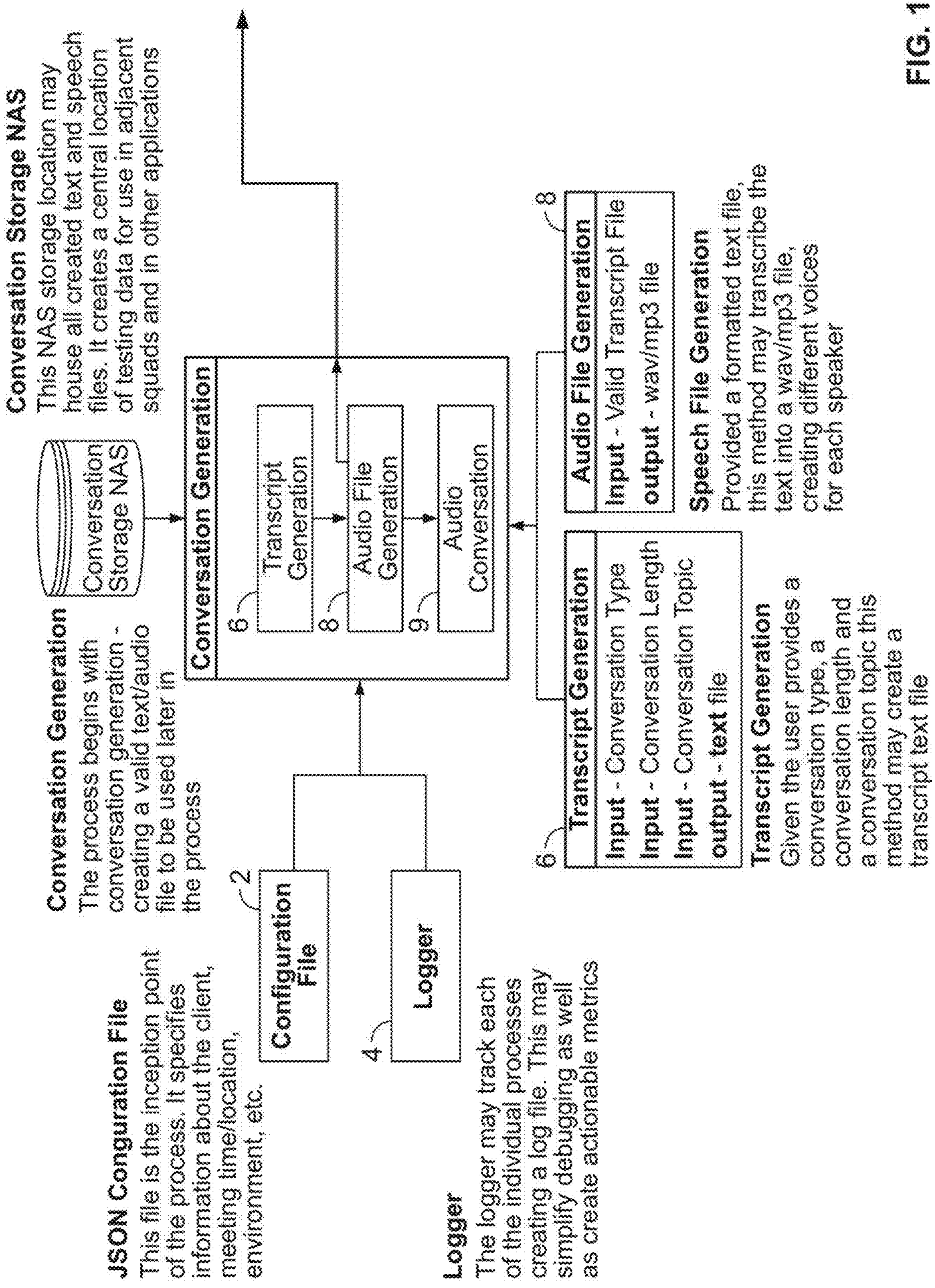
FIG. 1 depicts an example set of processes and data flows according to some embodiments.
Figure 1:
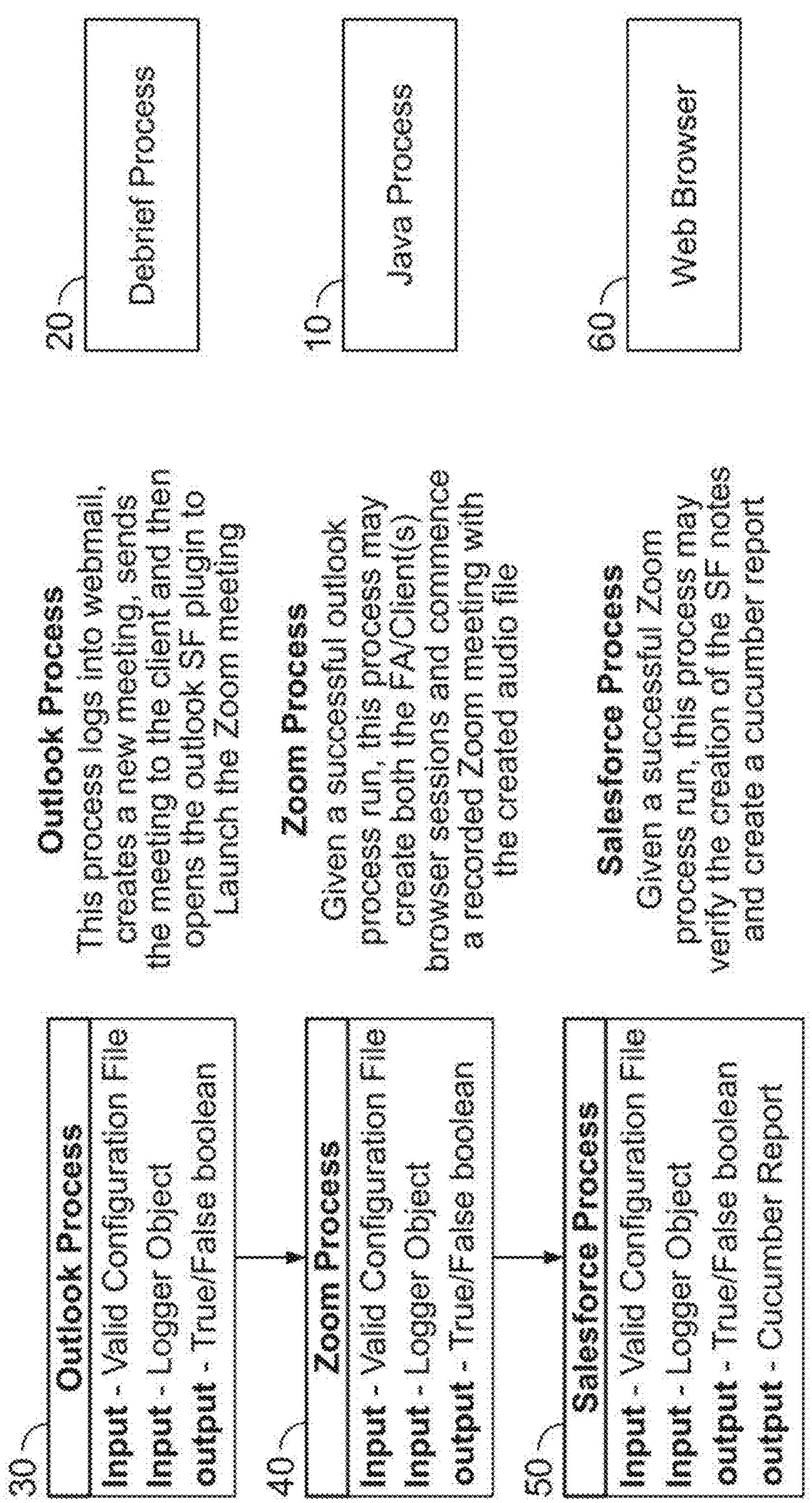

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

An embodiment may allow for the evaluation and testing of various systems involved in communications among multiple parties. An embodiment may provide or automatically create improved testing scenarios and inputs allowing for evaluation—by humans or computer processes—of a set of software packages used in interactions among parties, and of an automated summary tool acting as a notetaker, summarizer and first draft communication composer for client interactions, such as the Debrief tool from Morgan Stanley. An embodiment may provide improved testing input for such systems, for example by automatically handling all or part of a test process, for example generating audio conversations to use in such tests, reducing the need for humans to generate such audio. An embodiment may automatically test the end-to-end communications process of different parties including cooperation among an automated summary tool, a videoconferencing or communications application (e.g. the Zoom platform), an e-mail and calendar system (e.g. the Outlook system from Microsoft), a customer relations management (CRM) system such as provided by Salesforce, and other systems. This end-to-end testing may mimic the flow that a person such as an advisor might take if they were executing a meeting to be summarized using a tool such as the Debrief tool, including executing steps the advisor might take including setting up the meeting, sending the invite to another party, entering a conversation, etc., reducing the amount of human oversight needed to operate such testing. Even in cases where a human analyzes output of a Debrief tool, an embodiment which automates the setup and test process may save time.

End-to-End Testing

FIG. 1 depicts an example set of processes and data flows according to some embodiments. The operations and modules of FIG. 1 may be executed by computer systems shown in FIG. 2, but other computer systems may be used. In one embodiment, one computer carries out operations of FIG. 2, but in other embodiments multiple computers and/or a cloud computing system may be used.

Referring to FIG. 1, a conversation may be generated by conversation generation process 6 and audio generation process 8, for example in the form of an audio recording representing two or more simulated participants, such as an advisor and advisee or client. That conversation may be used as input in a process to test or operate a number of components. A configuration file 2, e.g. a JSON file, may specify information such as the parameters conversation to be created, a main topic of the conversation, and the parameters of a simulated meeting to take place. Such a configuration or JSON file may be created by a tester to specify parameters of a meeting such as length, location, etc. A logger 4 may track the various processes that occur, e.g. may track and record output or results for each among the various processes.

A conversation generation process 6 may use or input configuration file 2 and other information to create a textual transcript, which may be input into an audio file generation process 8, which may output an audio file 9 (e.g. a wav or mp3 file, or a file in another format), such as a simulated conversation between an advisor and advisee. Conversation generation process 6 may be for example Python code. The audio file may be stored in a repository such as a conversation storage NAS. Such a conversation may include different voices for each simulated speaker, and various topics.

The conversation may be generated in advance, before other systems are tested, systems such as an e-mail, personal information management, and calendar system 30 (e.g. the Outlook system from Microsoft), a communications, videoconferencing or teleconferencing application 40 (e.g. the Zoom system), and a customer relations management (CRM) system 50 such as a system provided by Salesforce. An interaction evaluation system or summary tool 20 acting as a notetaker, summarizer and first draft communication composer for client interactions, such as the Debrief tool from Morgan Stanley, may review interactions and meetings occurring using e-mail system 30 and communications or teleconference application 40 and produce output, for example populated into CRM system 50. Such output may be a summary of what was "said" during a video or telephone call, action items resulting from the call, and draft e-mail messages summarizing the call or action items for sending to a client. Each of e-mail system 30 videoconferencing application 40, and CRM system 50 may operate within a web-browser system 60 such as the Google Chrome browser, but may operate using systems other than or without a browser system. CRM system 50 may maintain a history of meeting invites and provide reminders for the first party, creating a meeting, to start hosting the meeting.

An example of a configuration file 2 is presented below in Table 1; other or different information may be included and other formats may be used:

TABLE 1

```
{
   "msEmail": "first.party@testcompanyname.com",
   "meetingTitle": "Debrief e2e qa1 flow 4",
   "meetingLocation": "https://ms-dev.zoom.us/j/7089847177",
   "meetingId": "708398471737",
   "hostName": "Host Name",
   "clientName": "TC Test 2 test 3".
   "meetingParticipants": ["sponsor@faketestcompanyname.com"],
   "audioPath":
"C:\\MSDE\firstparty\\conversation_generator\\v1\\audios\\fin_convo\\
fin_convo_1min.wav", // location of audio file for simulated conversation
   "audioFolder": "C:\\MSDE\\ firstparty\\experimental_debrief\\audio",
   "numClients": 1,
   "qaEnv": "qal",
   "sfEnv": "test-mailapp.force.com",
   "startDate": "current",
   "endDate": "current",
   "startTime": "2:00 PM",
   "endTime": "2:30 PM",
   "meetingDescription": "automated meeting description",
   "conversationText": "",
   "isHeadless": "False",
 "configurationString": "4min_finconvo"
}
```

A controlling process may coordinate and cause to be operated or executed the various software tools involved in a test. In one embodiment this is a Java process, but other types of processes may be used. For example, a Java process 10 may include a Java library which may control and interact with systems such as interaction evaluation system or summary tool 20, e-mail application or system 30, communications or videoconferencing application 40, CRM system 50, and/or other systems. Java process 10 may do this for example by mimicking keyboard, mouse, and other input to browser or other screen elements of web-browser system 60 in which or through which applications 30, 40 and 50 operate; and monitoring output to a display, such as monitoring output to browser or other screen elements. Java process 10 may control these or other software systems by methods other than web browser control. In one embodiment, the testing apparatus is housed within a Java environment which is used to manage the entire testing run (e.g., by making the major calls to tell the system which process to run and which output is expected). While in one embodiment a Java and Python process controls the testing; in other embodiments code other than Java and Python may be used. Java process 10, conversation generation process 6, e-mail system 30, videoconferencing application 40, CRM system 50, and other processes and modules discussed herein may all operate on the same hardware system, such as computer 100 of FIG. 2, but may operate on different systems which are in communication with each other, and may operate using a server or cloud system.

Interactions

Java process 10 may control e-mail system 30, videoconferencing application 40, and CRM system 50 to mimic the journey of a user (e.g. an advisor or advisee) by mimicking or producing keyboard and input device input, for example by opening web-browser system 60, and monitoring or keying off of browser elements when the relevant application is executed in browser 60 to obtain output from the applications.

In one embodiment, of the multiple simulated parties in a simulated meeting, one may have an existing e-mail address of a real human, such as the person or test operator using the hardware system on which the various processes are executed (such as computer 100 of FIG. 2), and the second party may be simulated using a fake proxy e-mail address, e.g. test@e-mailprovider.com. The second party may not be simulated using a computer separate from that of the first party, but possibly via a virtual machine or other process on the same computer as the execution processes for the first party; both parties' processes may be executed on the same computer.

Java process 10 may for example control e-mail system 30 to create or set up a meeting between an advisor and advisee; then control or cause a videoconferencing application 40 to host, enter or conduct the meeting. While Java process 10 may be one script or set of code, it may include subroutines or processes for sub-tasks, such as an e-mail (e.g. Outlook) process, conference or meeting (e.g. Zoom) process, and CRM (e.g. Salesforce) process which control these other systems. These subsections or subroutines may be called as subprocesses by an overarching Java script within Java process 10. Of course other organizational structures for code or scripts may be used, such as using multiple different processes or code segments.

An e-mail or Outlook process within Java process 10 may input configuration file 2, open the relevant browser, and use the browser to navigate to an e-mail system 30 (e.g. Outlook) to simulate its use by a party (e.g. FA); navigate to the calendar feature of the e-mail system 30; select (e.g. click on) the new meeting button; and create or set up a new meeting with the time, date, client and e-mail address (e.g. of other parties) specified in the configuration file 2 to create a calendar invite or other meeting invitation. The calendar invite may include the e-mail addresses of the simulated attendees. The e-mail or Outlook process within Java process 10 may navigate to the created calendar invite and select or click on a CRM system (e.g. Salesforce) plugin, select the simulated or test client to associate the meeting note with, and select or click on a button to launch a summary tool 20 application, e.g. the Launch Debrief button. For all these steps, an e-mail or Outlook process within Java process 10 may verify or validate whether each step in the test execution has been executed as expected and record the execution status in a report such as a Cucumber test execution report. In such a manner, an e-mail or Outlook process within Java process 10 may read the information from the configuration file; create an Outlook meeting invitation with a client as a test FA; open the summary tool 20 (e.g. the Debrief system) meeting through the CRM plugin; launch or conduct the simulated teleconference meeting; and verify all the above steps have been successfully executed. While in one embodiment the simulated parties are an FA and client, and the discussion relates to financial information, embodiments may be used in other contexts, with other parties and subject matter.

The various applications such as control e-mail application or system 30, communications or videoconferencing application 40, and CRM system 50 may communicate and coordinate with each other as is known. In one embodiment, Java process 10 may be executed on a "tester" computer (e.g. computer 100 of FIG. 2) such that the person acting as the tester has their credentials and computer and e-mail accounts used for the simulated analyst during the testing process. The mailbox or e-mail account of the tester is used as the "advisor" mailbox and their email messages become the "advisor" emails. The "advisee" e-mail mailbox may be a simulated test client (created independently, e.g. a simulated advisee account executed or hosted on computer 100 of FIG. 2, or another computer) with a mailbox which simply receives the email/invite for the test meeting from the advisor mailbox.

The simulated test client or advisee may be caused to join the communications application (e.g. Zoom) meeting. To effect this, Java process 10 may, via browser 60, operate e-mail applications to send and receive such e-mails, and log in the simulated advisor and advisee into the communications application, starting a meeting, and creating a guest browser which may enter the communications application as the simulated test client. A plugin such as a Salesforce Plugin may be a component, e.g. within Outlook, that controls client selection and the initiation of a Zoom or other meeting launch, and may exchange data between an e-mail and calendar application and a CRM application. Interactions with this component may occur during execution of e-mail or Outlook process section of Java process 10.

Java process 10 may use a share screen functionality in a communications application to simulate a user such as an advisor talking into the communications application client. While in one embodiment all processes are executed on a single computer, an embodiment may create two browser instances, typically on the same computer, which both participate in the virtual meeting. From the perspective of the communications application (e.g. Zoom) recording, a single meeting with two distinct clients may take place, and audio is captured as a single channel containing all spoken and sound content that occurred during the virtual meeting. Therefore, on a resulting recording, there may be no explicit distinction between the clients (e.g. advisor and advisee) other than the tone, style and cadence of their voices. These processes may be executed on the same device (e.g. computer 100 of FIG. 2), however may be partitioned to represent two distinct clients.

In one embodiment, a controlling process such as Java process 10 may, in order to execute or conduct a meeting or teleconference process, read a configuration file, open two instances (or as many instances as there are participants) of a browser process 60 (e.g. a Chrome process), and use the browser process 60 to navigate to videoconferencing application 40 (e.g. a Zoom system), possibly using a tool such the Playwright web automation library provided by Java. With one of the instances of the browser process 60 (e.g. corresponding to a simulated financial advisor), the Java process 10 may join the launched videoconferencing application 40 meeting and enter a control (e.g. click on) to the "join by" audio button; then in the second of the instances (e.g. a simulated client), may enter a control to join the launched meeting and wait for the Java process 10 to enter a control to cause the first simulated participant (e.g. financial advisor) to enter a control or click on the admit button to accept the second participant (e.g. client). In the instance controlled by or corresponding to the first party (e.g. simulated financial advisor) Java process 10 may enter a control or click on the record button and verify that the recording has started. In the instance controlled by or associated with the second participant, Java process 10 may enter a control to enter a share screen or share content functionality, or click on the share screen button and verify that the screen share has started, in order to share the audio of the simulated conversation.

Java process 10 may then trigger the audio or simulated conversation created during the conversation generation operations to be played or input to videoconferencing application 40 in its entirety; this audio may be entered via a share screen function, which may allow sharing of a desktop screen and also audio or video files. Other methods of entering recorded audio into the simulated meeting may be used. The generated audio file corresponding to the transcript may be divided into two, one for each participant, and Java process 10 may alternately enter or play audio from each participant into the browser process 60 executing videoconferencing application 40 for that participant, switching between the participants to simulate a first participant speaking then a second participant speaking. Thus an audio file with a conversation for each of the multiple participants may be input to a separate browser or virtual machine. Both processes or virtual machines may be executed at the same time, and a synchronization process within Java process 10 may read a portion of a conversation for a first participant, stop, and read portion of a conversation for a second participant. Alternately, one audio file with all participants may be input to the meeting.

Once the audio is verified to have been completely played, in the instance controlled by the first party, Java process 10 may end the meeting. For example Java process 10 may end the screen share process, click on the end record button and then click on the end meeting button. Java process 10 may for all these meeting simulation steps, verify that each step in the execution has been completed and record the execution status, for example in a Cucumber test execution report.

Thus, in one embodiment, Java process 10 may provide or input an audio stream or recording to videoconferencing application 40, the audio stream including a simulated conversation among a number of simulated participants, e.g. an advisee and advisor. For example, Java process 10 may use a preexisting or native videoconferencing application 40 feature to insert or input audio file 9 into videoconferencing application 40, e.g. into the meeting process, to simulate a conversation. Communications or videoconferencing application 40 may enable or host one or more of audio and video communications, text communications, etc., among multiple parties: in one embodiment an audio channel is evaluated from a video recording of the simulated conversation that is part of the meeting process.

Java process 10 may cause an interaction evaluation system such as summary tool 20 to execute to review and summarize an interaction or meeting, for example to summarize the meeting or interaction, and provide notes, action items, summaries, and/or draft e-mails. These summary products may be input to CRM system 50, or to another module.

Validation

A control process such as Java process 10 may evaluate the functioning (e.g. during the simulated meeting process) of systems such as e-mail system 30, videoconferencing application 40, and CRM system 50, and verify or validate that the various applications provide the correct output and behavior. This may be done during execution of various tools, e.g. at the time that input is being made to videoconferencing application 40 to check that videoconferencing application 40 is responding properly, and also after the meeting is over. For example, after Java process 10 has verified that each step prior to verifying a note has been completed, Java process 10 may read configuration file 2, open a browser 60 instance and navigate to the CRM system 50 (e.g. Salesforce) home page, for example using the Playwright web automation library provided by Java. Once the browser is open, Java process 10 may use Java native libraries to trigger a wait time process, e.g. for 5-10 minutes, to wait for a note or summary from summary tool 20 to be generated/processed in CRM system 50. Java process 10 may then navigate to a note section of CRM system 50, the "Note" page list view, then navigate to the note corresponding to data identifying the simulated meeting, such as the title and date information specified in the configuration file. Java process 10 may then verify the presence of the note summary associated with the simulated meeting in CRM system 50. Java process 10 may verify that each step related to the note has been completed, and record the execution status, for example in the Cucumber test execution report. In the case of a successful run of the note process, Java process 10 may open the browser to the Salesforce homepage. Java process 10 may verify that each step related to the note has been completed.

Thus in one embodiment a control process such as Java process 10 may perform automatic validation to check whether a test including a summary tool such as Debrief was performed accurately, and may check that all stages of the testing flow have been executed. For example, Java process 10 may check whether the e-mail, videoconferencing, and CRM processes have been properly completed from a test execution perspective (e.g. checking whether the correct buttons were clicked, checking whether the audio is being played, checking whether the summary is available in a CRM system, etc.).

A CRM or Salesforce process within Java process 10 may integrate CRM system 50 with the end-to-end test. This may execute after both the e-mail (e.g. Outlook) and teleconference (e.g. Zoom) processes finish. A CRM or Salesforce process may automatically cause a test user (e.g. acting as the Financial Advisor) to navigate to a Salesforce, homepage, navigate to the Zoom Meetings Note page, and then click on the title that corresponds to the e-mail meeting invite title specified in the config file. An embodiment may set up such a test procedure allowing later automated or non-automated evaluation of the quality of a summarization created by, e.g. a Debrief process seen in a CRM tool.

CRM system 50 may automatically track and record meeting data and notes, e.g. generated by summary tool 20, and the accuracy of this data recorded for a meeting in CRM system 50 may be evaluated and validated by Java process 10. When a meeting is over notes of the meeting may be kept in CRM system 50, e.g. as Salesforce Notes, and when in actual use as opposed to a testing scenario a summary may be sent to second party (e.g. client) based on the meeting notes in Salesforce Notes. A history of email communication sent as summary may also be tracked within a Salesforce application. As part of an evaluation a verification or validation may take place that the that data generated from the meeting held via videoconferencing application 40 is correct, e.g. that the videoconferencing application 40 data for that meeting known to Java process 10 is the same as the CRM system 50 data for that same meeting (e.g. what a Salesforce process says what was spoken in a Zoom meeting is correct). A process may confirm that data generated by an interaction evaluation system or summary tool 20 is correct and matches other data known to Java process 10 about a certain interaction. Summary tool 20 (e.g. the Debrief system) may input data from the videoconferencing application 40 meeting and possibly other data and may use AI tools such as generative neural networks and may generate notes or summaries of the interactions or meetings, action items to be taken based on those meetings, and draft e-mail messages for review including these summaries and/or action items. Such information may be input into CRM system 50, and may be evaluated for accuracy.

Validation by Java process 10 may include generating Boolean or other values, e.g. by Java process 10, for a number of evaluations, to determine if the test generation process and/or the summary tool 20 evaluation process executed correctly.

Testing may include simulating multiple virtual users speaking and delivering valid responses to each other's statements or questions. A process may handle obtaining valid summary notes; and validating if the Open AI model is able to process the conversation such that the meeting summary has been generated after the meeting has been executed.

Table 2 below depicts a set of error messages which may be created by Java process 10.

TABLE 2

| Error Scenario | Explanation | Example Error Message |
|---|---|---|
| Invalid email message | Email is not associated with a valid client in SF CRM system | No Profile is found for this email address |
| Prospect error message | Email is associated with a prospect rather than a valid client | No Profile is found for this email address |
| Client legal address not in US | Email is associated with a client whose legal address is outside of the U.S. | Client legal address is not in the United States |
| RIVA Sync Message | Riva Sync has not synched the details with salesforce | The outlook invite has not synced with Salesforce. This can take up to 5 minutes. Please close the meeting invite or Debrief plugin and look for the Launch Debrief button to appear |
| Zoom meeting details not provided | Meeting invite is missing the Zoom meeting link | We're sorry the meeting invite is missing details. Please review the Zoom location details and client email addresses. Send the invite and wait up to 15 minutes for the event to be synced with Salesforce |
| Zoom meeting details and Client email details are not provided | Meeting invite is missing both the Zoom meeting link and the client email address | We're sorry the meeting invite is missing details. Please review the Zoom location details and client email addresses. Send the invite and wait up to 15 minutes for the event to be synced with Salesforce |
| Client email details are not provided | Meeting invite is missing the client email address | We're sorry the meeting invite is missing details. Please review the Zoom location details and client email addresses. Send the invite and wait up to 15 minutes for the event to be synced with Salesforce |
| Online Scheduler meeting not confirmed | Meeting has not been confirmed by the FA in the case of Online Scheduler meetings | Online Scheduler Meeting is not yet Confirmed |

Java process 10 may determine if an error occurs at each stage if for example the end-to-end process does not continue. For example, each function in the code of Java process 10 (e.g., an e-mail process, conference or meeting process, and CRM process, etc.) may have or may produce an attached log message that may capture and save when the function begins and when the function ends. By analyzing such a log file a process or reviewer may understand exactly which function or sub-function has failed and which has not failed in the process. When a subfunction or process fails, there may be an error message related to the automation script such as Java process 10 being unable to continue. For example, possibly a browser page did not load correctly, or a component is occluded.

Table 3 below shows an example set of log messages showing an end-to-end test progress in a log file.

TABLE 3

| |
|---|
| 2024-07-03 09:55:23.656651 20 FA join_zoom_meeting process started - trying to join/host zoom meeting |
| 2024-07-03 09:56:03.869644 20 FA join_zoom_meeting process complete - FA is now in the zoom meeting |

TABLE 3-continued

| |
|---|
| 2024-07-03 09:56:20.363276 20 Client join_zoom_meeting process started - attempting to join the zoom meeting |
| 2024-07-03 09:56:29.814919 20 Client join_zoom_meeting process complete - client has joined the zoom meeting |
| 2024-07-03 09:56:29.829916 20 FA admit_client process started - trying to admit clients |
| 2024-07-03 09:56:35.635815 20 FA admit_client process completed - Client Admitted |
| 2024-07-03 09:56:35.640818 20 join_by_audio procecss started |
| 2024-07-03 09:56:44.321629 20 join_by_audio procecss complete |
| 2024-07-03 09:57:04.407305 20 start_screen_share process started - trying to start screen share and play audio |
| 2024-07-03 10:02:15.857747 20 start_screen_share process complete - audio has finished playing |
| 2024-07-03 10:02:20.877460 20 stop_screen_share process started - trying to stop screen share |
| 2024-07-03 10:02:23.978000 20 stop_screen_share process complete - screen share has stopped |
| 2024-07-03 10:02:29.034036 20 FA end_meeting process started - trying to end meeting |
| 2024-07-03 10:02:33.210069 20 FA end_meeting process completed - meeting has ended |

A file such as a config.json file may determine the execution and behavior of a testing or test creation process. A process may, according to a file such as a config.json file, execute a test process based on a generated audio conversation. A config.json file may specify a meeting location (which may be communications or meeting software such as the Zoom platform); a meeting ID, the names of the virtual agent and client used for the test, the path(s) of relevant data such as the audio file used for the test conversation, times and dates of the meeting, and other information. A process such as Java process 10 may input this config file; create and save a new meeting in the relevant software such as the Outlook platform and Zoom platform; send e-mails to set up the meeting (e.g. from an identified first party such as an advisor, to identified second party such as a client; one or all of the e-mail accounts may be associated with real people or may be fake accounts); launch the interaction or meeting software (e.g. a Zoom meeting, possibly signing in using the first, second, and possibly other parties), signing in as the first party (e.g. a simulated FA which may use credentials of the user executing the process); and cause a simulated second client (e.g. the second party) to join the meeting; and cause the second party to be "admitted" to the meeting if needed. An audio file may be input to interaction software such as the Zoom platform. After the meeting ends, a summary process may input to CRM software (such as the Salesforce system) a summary of what was audibly spoken at the meeting, and possibly other information.

Additional Tools

Additional tools or systems may be used. For example, the Cucumber system may be used with Java code to translate Java code to a natural language set of instructions, where each natural language unit or sentence is linked Java code controlling a test process. A test execution management system may include a Cucumber Automated Test system and a Test Suite Manager, interfacing with other modules such as a Playwright system. Cucumber is a tool for running automated acceptance tests, written in plain language. It makes use of files including:

a. A feature file which is written in natural language, e.g. plain English; and b. A step definition file which is written by the developer.

A Cucumber tool may allow linking the plain text acceptance criteria with automation code created by the developer, allowing for non-technical individuals to understand the structure of the automation test without having to dive into the code. For example, the feature file text: "When I navigate to the zoom web homepage" may correspond to step definition file code "Page.NavigateToZoomHomepage( )". To use Python code within a Java Cucumber testing framework, an embodiment may turn Python files into executable file(s) to allow preserving the functionality of the original Python code while integrating the process to a native Java testing framework. Table 4 below depicts an example feature file used in an end-to-end test process according to one embodiment. Example Outlook process (e.g. to simulate that a FA is able to start and complete "Outlook" process), Zoom process, and then Salesforce process functions are shown in Table 4:

TABLE 4

```
@RFB_Demo
Feature: Debrief Regression Testing
Scenario Outline: Debrief End to End Flow
  Given FA is able to start and complete "outlook" proccess
  Given FA is able to start and complete "zoom" proccess
  Given I trigger the Wait Time Process
  When I navigate to "Notes" page
  Then I click on "Recently viewed" dropdown
  And I click on "Zoom Meetings" to see the zoom meeting notes
  And I click on "Date"to sort in descending order to see the
latest note in "Notes" page
  Then I click on the "NoteNumber" in "Notes" page and verify the
"<MeetingTitle>" of the meeting
  When I click on "We want to hear you back" in the Notes page
  Then I click on the "Provide Feedback" links to give the feedback
  Then I click on "Submit" button
    Then I click on the Draft Email button
    Then I click on the preview button to view the email in preview
mode
  Then I click on the "Send Email" button to send the zoom meeting
summary notes to the client
  When I click the checkbox on the External Email Attestation Popup
  And I click on the Send Email button and the email is sent to the client
  Examples:
  | MeetingTitle |
  | Debrief E2E Tuesday 30 2024 930AM |
```

In an example Outlook process (which may be considered a section of Java process 10), the automated Outlook process causes a test user (acting as the Financial Advisor) to set up the meeting with the client through an outlook calendar invite. The invite is then filled in with the client details (e.g. from a Salesforce Client program) and the Zoom invite details (e.g., date, time, zoom link based on the config file). Following the completion of this step, the Outlook process may open the sent meeting invite, click on the Salesforce Plugin, choose the client to associate the meeting with (based on the config file), and then launch the meeting. This may be the end of the Outlook process.

A Riva Sync system may be used to link CRM system 50 (e.g. a Salesforce System) and e-mail system 30 (e.g. an Outlook application), for example taking Outlook meeting data and entering it into a Salesforce process. The Riva Sync product may automatically sync calendar events in an Outlook system with calendar events in a Salesforce system. For example, if a meeting is created in Outlook with a client, such a process may enable that meeting to be created in Salesforce without manually creating it. A Riva Sync process may do this creation in Salesforce and vice versa. A Riva Sync process may ensure that an Outlook calendar invite created within the Outlook process is successfully synced on the Salesforce side. This may ensure that the emails that are recipients of the simulated Outlook meeting invite also correspond to valid Prospects/Clients in Salesforce. As with other systems and products mentioned herein, while Salesforce, Outlook, Riva Sync, Playwright and other systems are used as examples, these specific systems need not be used, and other CRM, calendar, email, etc., systems may be used.

The Playwright system may be used to interact with web browser systems such as videoconferencing application 40, to control and receive data from a browser. A Playwright browser execution library may be called, e.g. via Java process 10 to execute browser functions such as navigating to Outlook or clicking a Zoom record button. An example illustrating how these modules fit together is: Java Code>Cucumber plain text->Playwright code execution->Debrief End to End begins. In this example, the Java program looks at the plain text acceptance criteria (e.g. Cucumber), matches it to the corresponding Playwright library code (e.g. Java code) and then begins running the automated end-to-end test. Playwright Java code may ingest input parameters in the form of a configuration file as described elsewhere herein.

Conversation Generation

A conversation generation process may create a natural audio conversation among multiple parties using as input specially created prompts to an LLM. A series of such conversations may vary over time by using different prompts. Such a process may automatically generate a transcript, and from this transcript a process may generate one or more voice or audio files simulating what the parties speak during an interaction. Such a process may execute a prompt control or generation process to create various prompts, provide to an LLM the prompts to cause the LLM to create text output, and then provide the text output to a text-to-speech process to produce the audio stream. The audio stream may be a simulated conversation among a number of simulated participants, such as an advisor, an advisee, and/or other simulated parties. Embodiments may automatically tailor prompts to generate a diversity of conversations each with a diversity of subjects, diversions, etc. to provide realistic inputs to interaction processes, including notetaker and summarizer modules. A prompt control process may first input a topic, use the topic to create a prompt to input to an LLM in order to output subtopics, which the prompt control process may use to generate a transcript. A topic (e.g. a specific surgery, stock speculation) may be input or generated to provide an umbrella to guide the transcript generation and be sent to an LLM, which based on this input generates subtopics (e.g. a comma separated list of subtopics). The subtopics may be used to generate further prompts which are sent back to the LLM to generate the transcript, the transcript conversation discussing the subtopic within the context of the topic. Additional information provided in the prompts to the LLM may include an overall structure of the conversation to be created. A validation process may determine whether or not the conversation generation process was accurate, for example whether the correct topics are added or not.

In one embodiment a main topic (e.g. financial planning, or other predefined topics) may be entered into a configuration file, and an automatic process may input the configuration file including conversation parameters such as main topic, generate subtopics based on the main topic, and then generate the conversation. In other embodiments a human may input topic and subtopics. Sample topic definition entries may include "5min_silence_5min_finconvo_5min_random", indicating that the LLM should generate 5 minutes of silence, 5 minutes of a financial conversation, and 5 minutes of random (e.g. small talk) conversation; and "90min_finconvo_5min_random".

For example, based on the example topic "Retirement Planning", subtopics may be generated including:

Subtopic 1: Savings
Subtopic 2: retirement accounts (401k, Roth, IRA)
Subtopic 3: Financial Planning
Subtopic 4: Budgeting
Subtopic 5: Required minimum distributions
Subtopic 6: Social Security A conversation generation process 6 may include a prompt control or generation process which may automatically generate subtopics based on inputs such as a main conversation topic provided as input by a human to a configuration file (for example: "Retirement", or "Stock Speculation"), which may be used as a guide for the entire conversation to be produced. A transcript generation process may input data such as a conversation type (e.g., financial conversation, personal conversation, a PII induced conversation, off-topic conversation such as sports), conversation length, and main or overall conversation topic from the configuration file. The process may then call a process such as an open source LLM API (e.g. a Mixtral or Llama model), prompting it to create subtopics based on the given topic. An example LLM used is an open source LLM such as the ModelScope GPT (provided by Morgan Stanley), Mixtral 8x7B, or Meta-Llama-3-70B, which may be used for transcript generation and transcript formatting. By inputting data to the configuration file, a user may specify options such as whether the transcript should include simulated PII (personally identifiable identification). For each subtopic output by the LLM in response to the first prompt to the transcript generation process, a conversation generation process may make subsequent calls to the open source LLM API, prompting it to create paragraphs of text in a specified multiparty (e.g. client/FA) format. The transcript generation process may compile all the API responses, e.g. text files of simulated conversations, from the previous step into a single conversation transcript text file. A verification process may be executed. Thus such a process may create a transcript file including financial information related to the topic specified in the configuration file; create a transcript file including financial text combined with PII text; give a user a high level of transcript customizability; and ensure that the transcript is in an acceptable format.

A conversation generation and prompt control process may be fully automated, and controlled by inputs. For example a Python script may be executed, inputting a config file including inputs such as topics, and may generate a single or multiple conversations of varying length, depending on the config file. In one embodiment, for an end-to-end test, only one conversation is created which can be controlled from a config file. An LLM may input a conversation topic and be prompted to generate a list of subtopics, possibly with parameters such as the number of subtopics (e.g., fundamental analysis, technical analysis, industry trends, company financials, market sentiment, risk management, etc.) that would typically arise in a conversation about the main topic. The LLM may then generate conversation text: using the generated list of subtopics, the LLM may be prompted to generate a conversation transcript between an advisor (e.g., an FA) and another party (e.g., their client) with the context of the subtopics provided. A separate conversation may be generated for each subtopic (typically the LLM is asked to generate a conversation on the subtopic within the context of the umbrella topic). Parameters, e.g. in a configuration file, may allow for the adjustment of the number of clients or other adjustments.

The LLM or another process may then clean the transcript: the transcript produced before this stage may be several different conversations, one for each subtopic, and cleaning may be used to create a coherent conversation. This may include merging the conversation generated based on each subtopic together, prompting the LLM to augment the end and start of the merged conversation to preserve continuity, and adjust the formatting of the conversation (e.g., removing special characters, preserving transcript format, etc.) for text-to-speech readiness.

An example prompt input to an LLM to create subtopics based on or within the context of an overall topic may be: "Create a comma separated list of topics that a financial advisor may discuss with their client within the context of {topic}. Provide at least 6 examples in the format: topic 1, topic 2, topic 3, topic n".

An example prompt input to an LLM to create a conversation transcript from input topics or subtopics (where subtopics are generated by an LLM) may: "Simulate a comprehensive financial conversation between two individuals-A financial advisor and their client Mr Johnson. The conversation should revolve around the Financial Advisor providing guidance to the client about {subtopic} within the context of {topic}. The output format will be 'Financial Advisor: 'some text\n' Client: 'some text\n' and then continue for at least 35 paragraphs. Every line of text should be preceded by either the Client or the Financial Advisor".

A prompt may take into account non-financial or off-topic discussions, to have part of the generated conversation diverging off-topic; the output resulting from such an off-topic discussion may be combined with output from an on-topic discussion. A prompt may be input to an LLM such as the following example prompt, with non_fin_topic being a topic not associated with a main topic: conversation_prompt=f"Simulate an interesting conversation between two individuals-A financial advisor and their client Mr Johnson. The conversation should revolve around Client conversing with Financial Advisor about {non_fin_topic}. The output format will be 'Client: 'some text\n' Financial Advisor: 'some text\n' and then continue for at least 35 paragraphs. Every line of text should be preceded by either Client or Financial Advisor. The First line should be: Let's change topics and talk about {non_fin_topic}". Off-topic conversation generation may include asking an LLM for a conversation an individual may have with their friend. Such off-topic non-financial information is to be excluded from summary, and may be included to accurately simulate the type of interactions an FA may have with their client outside of the financial advice provided.

Other prompts may be used.

The conversation transcript (e.g. cleaned and formatted, e.g. as a text file such as in the format.txt, or another format) may be passed to an audio file or text-to-speech (TTS) generation process which may create an audio conversation file according to the transcript, for example as a. wav or other format file. One embodiment inputs the text file to a TTS process using the Pyttsx3 text to speech library; other systems may be used. The TTS process may generate an audio file (e.g. a wav file, or another format) to be used in simulating interaction (e.g. as a Zoom conversation). Additional parameters, for example in a config file, may give the human tester control over speaker gender, tone, and speed, or other parameters.

An audio file generation process may read in the text file from the transcript generation step, calculate the number of speakers in the file, assigning a different voice for each speaker; assigning other characteristics to a speaker such as gender; for each line or speaker assign the correct voice and transcribe the text line into an audio file; and repeat this until all lines have been translated to audio, validating that each step has been completed. In one embodiment, a different audio file is generated for each speaker, each file to be input to a separate meeting process (e.g. browser and meeting software). Alternately, the audio file generation process may combine multiple audio files generated into a single audio file. For all the audio generation steps, a process may verify whether the execution has passed. Such a process may read the text file from the previous transcript generation step and create a corresponding audio (e.g. wav audio file with different voices for the different speakers. A generated transcript may include speech occurring in typical real-world conversations such as confusing speech, garbled speech, and speech in a language other than the main language spoken.

A portion of sample transcript produced by an LLM to be input to a text-to-speech process is shown below in Table 5, and may include text labelled by speaker (typical transcripts used are lengthier to simulate a longer conversation):

TABLE 5

| |
|---|
| Financial Advisor: Hi Mr. Johnson, it's great to see you again. How have you been? |
| Client: Hi there! I'm doing well, thanks for asking. I've been considering some investments lately, so I thought it'd be a good time to get some professional advice. |
| Financial Advisor: That's great to hear, Mr. Johnson. Investing in the stock market can be a fantastic way to grow your wealth, but it does require careful consideration and planning. Have you had any experience with stock market analysis before? |
| Client: Honestly, no. I've always been more of a passive investor, putting my money in mutual funds or letting my bank handle it. But I've been hearing a lot about stock speculation lately, and I'm curious about how it works. |

TABLE 5-continued

| |
|---|
| Financial Advisor: Stock speculation can be quite exciting, but it's also riskier than more traditional investment strategies. It involves predicting short-term price movements and making trades based on those predictions. Let's start by discussing some key concepts in stock market analysis that can help you make more informed decisions. |

A typical transcript may be many minutes long, and lengthier than the example of Table 5, but may be other lengths.

A dynamic conversation generation process may improve testing technology by eliminating the need for a human tester to manually conduct a meeting (e.g. an "FA meeting"), since an embodiment may have an automated process dynamically generate an audio file containing conversations on a chosen topic (e.g. financial conversations), and may allow a user to easily change the generated conversation by changing the input config file. The dynamic nature of this may allow for flexibility in choosing the financial topic, speaker characteristics, speaker gender, speaker rate, conversation length, and number of speakers. The conversation output may be input to a process which combines novel techniques across multiple different applications to simulate the complete end-to-end advisor-client process in a testing environment. Such easily changeable and dynamic test generation may result in testing variability, testing of edge cases, and understanding the limits and boundaries of a summarizer and first draft communication composer solution (e.g. the Debrief tool), improving the technology of such summarizer tools.

Embodiments may improve software testing technology. Embodiments may facilitate the simulation of an electronic interaction such as a financial analyst/client zoom meeting, automating the process of creating a meeting (e.g. via e-mail or scheduling in an e-mail application such as Microsoft Outlook), generating an audio file of a conversation to be input to a meeting application such as the Zoom application, and simulating the process of such an interaction or meeting. An embodiment may automate the entire end-to-end testing process of a summarizer or evaluation application such as Morgan Stanley's Debrief tool, reducing the manual testing and test creation time and increasing the rate at which testing occurs. Embodiments may increase the scope of end-to-end testing coverage by giving testers the ability to generate a diverse set of conversation audio files in various domains (e.g. financial discussions, other advisor/client discussions, etc.). Embodiments may provide a basis for other applications to utilize the created components. Embodiments may improve such testing by allowing for longer simulated interactions or meetings; and replacing manually having users speak to produce such interaction.

Prior systems require tedious manual testing of components such as Outlook; Zoom; Salesforce; Debrief etc. Embodiments of the invention may improve such technology by automating at least part of this process and allowing replication of some meetings, increasing the testing rate compared to the number of available human testers. Embodiments may reduce the original manual testing time of for example ~25 minutes to for example ~16 minutes for the same parameters and type of test. Embodiments may increase the scope and coverage of testing, giving users the ability to create rich audio conversations of a desired length. Embodiments may enable the exploration of a diverse set of test cases without imposing additional demands on a QA team, allowing them to focus on more critical manual tasks.

Embodiments may provide dynamic generation of test parameters so that a notetaker or summarizer application may be tested. Due to the comprehensive nature of notetaker and summarizer applications such as the Debrief application, there may be several steps involved (spanning for example three applications) in completing an end-to-end test, such as conducting a teleconference using communications software (e.g. a Zoom meeting) between a simulated client and simulated analyst or other entity. An embodiment may may improve testing technology by providing access to a wider variety of test cases due to the ability to change key parameters (conversation topic, conversation length, speaking tone, speaking style, etc.), e.g. by modifying a configuration file.

Figure 2:
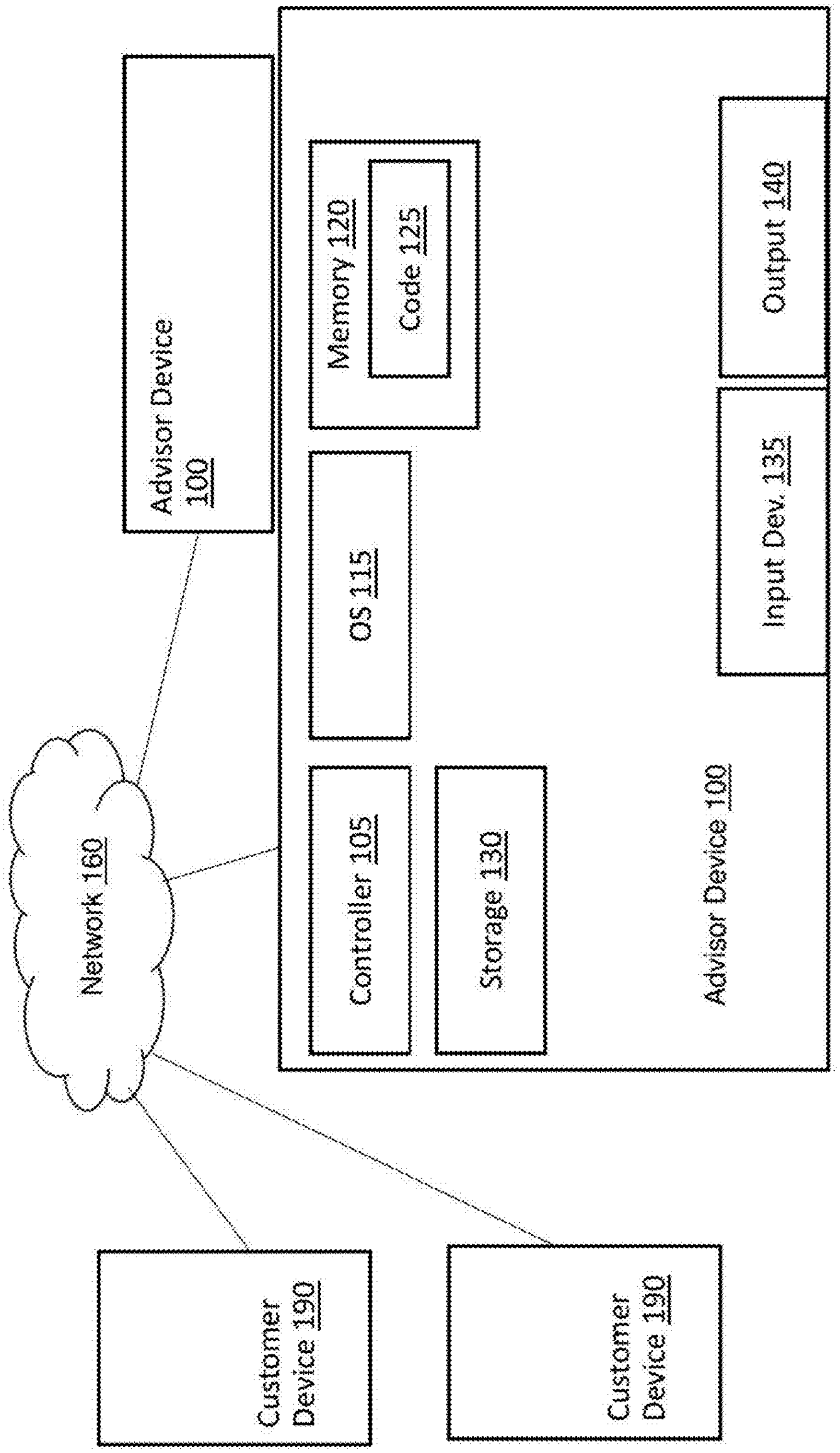
FIG. 2 depicts a system for testing an interaction summary evaluation system according to embodiments of the present invention.

FIG. 2 depicts a system for testing an interaction summary evaluation system according to embodiments of the present invention. Referring to FIG. 2, during non-test use parties to meetings or interactions such as advisors may use advisor devices 100 to communicate with other parties to meetings or interactions, such as customers, who may use customer devices 190 to communicate with advisor devices 100. For example, during non-test use parties may communicate with each other using devices 100 and 190 using video (e.g. using communications or videoconferencing applications 40, which may be executed by and installed on devices 100 and 190), voice (e.g. a telephone call, or VoIP), e-mail messages, text, chat, etc. Devices 100 and 190 may be computers such as desktop or laptop computers, workstations, server computers, mobile computers, tablets or smartphones, or in some cases may be smartphones or telephones (e.g. in the case of a meeting participant dialing in to the meeting). Devices 100 and 190 may be connected by one or more networks 160, such as a telephone system (e.g. POTS), the internet, or an intranet.

While devices are described as advisor and customer devices parties other than advisors and customers may use embodiments of the present invention.

During test use, rather than communicating with customer devices 190, an agent device 100 may be used to execute test system processes as described elsewhere herein, such that one advisor device 100 may execute all of Java process 10, interaction evaluation or summary tool 20, e-mail application or system 30, communications or videoconferencing application 40, CRM system 50, and other modules described for testing. In another embodiment, a computer other than an agent device may be used for testing, and may execute Java process 10 and other processes. For example all or some of such processes may be executed by a server or cloud computing system.

A set of example components such as a processor, memory, etc. are shown in one device 100, and other devices 100 and 190 may include similar or other components. Advisor device 100 may be one or more computer systems including a controller 105 that may be, for example, a central processing unit processor (CPU) or any other suitable multi-purpose or specific processors or controllers, a chip or any suitable computing or computational device, an operating system 115, a memory 120, executable code 125, a storage system 130, input devices 135 and output devices 140.

Controller 105 (or one or more controllers or processors, possibly across multiple units or devices) may be configured to carry out methods described herein, and/or to execute or act as modules described herein, for example when executing code 125. Executable code 125 in combination with controller 105 may act as Java process 10, Java interaction evaluation or summary tool 20, e-mail application or system 30, communications or videoconferencing application 40, CRM system 50, and other modules described herein. One or more devices such as advisor device 100 may carry out functions such as those described in FIGS. 1 and 3.

Operating system 115 may be or may include any code segment to coordinate, schedule, or otherwise manage operation of computing device 100, for example, scheduling execution of software programs or enabling software programs or other modules or units to communicate. Memory 120 may be or may include, for example, a Random Access Memory (RAM), a read only memory (ROM), a Dynamic RAM (DRAM), a Flash memory, a volatile or non-volatile memory, a cache memory, or other suitable memory or storage units. Memory 120 may be or may include a plurality of, possibly different, memory units. Memory 120 may be a computer or processor non-transitory readable medium, or a computer non-transitory storage medium, e.g., a RAM. Executable code 125 may be any executable code, e.g., an application, a program, a process, task or script. Executable code 125 may be executed by controller 105 possibly under control of operating system 115. One or more executable code 125 segments may configure controller 105 perform methods disclosed herein, and one or more executable code segments 125 may be loaded into memory 120 and cause controller 105, when executing code 125, to carry out methods described herein.

Storage system 130 may be or may include, for example, a hard disk drive, a CD-Recordable (CD-R) drive, a universal serial bus (USB) device or other suitable removable and/or fixed storage unit. Data used with methods described herein may be stored in storage system 130 and may be loaded from storage 130 into memory 120. In place of storage 130 associated with a specific device 100 or 190, NAS (network attached storage) or other remote storage may be used.

Input device(s) 135 may be or may include a mouse, a keyboard, a microphone, a touch screen or pad or any suitable input device. Output device(s) 140 may include one or more displays or monitors, speakers and/or any other suitable output devices. Any suitable number of input or output devices may be used. Various input/output (I/O) devices may be connected to computing device 100 as shown by blocks 135 and 140. For example, a wired or wireless network interface card (NIC), a printer, or a universal serial bus (USB) device may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While specific elements and modules of FIGS. 1 and 2 are shown as an example hosted by specific computers, in other embodiments, such elements may be hosted by other computers, in cloud based systems, etc.

Figure 3:
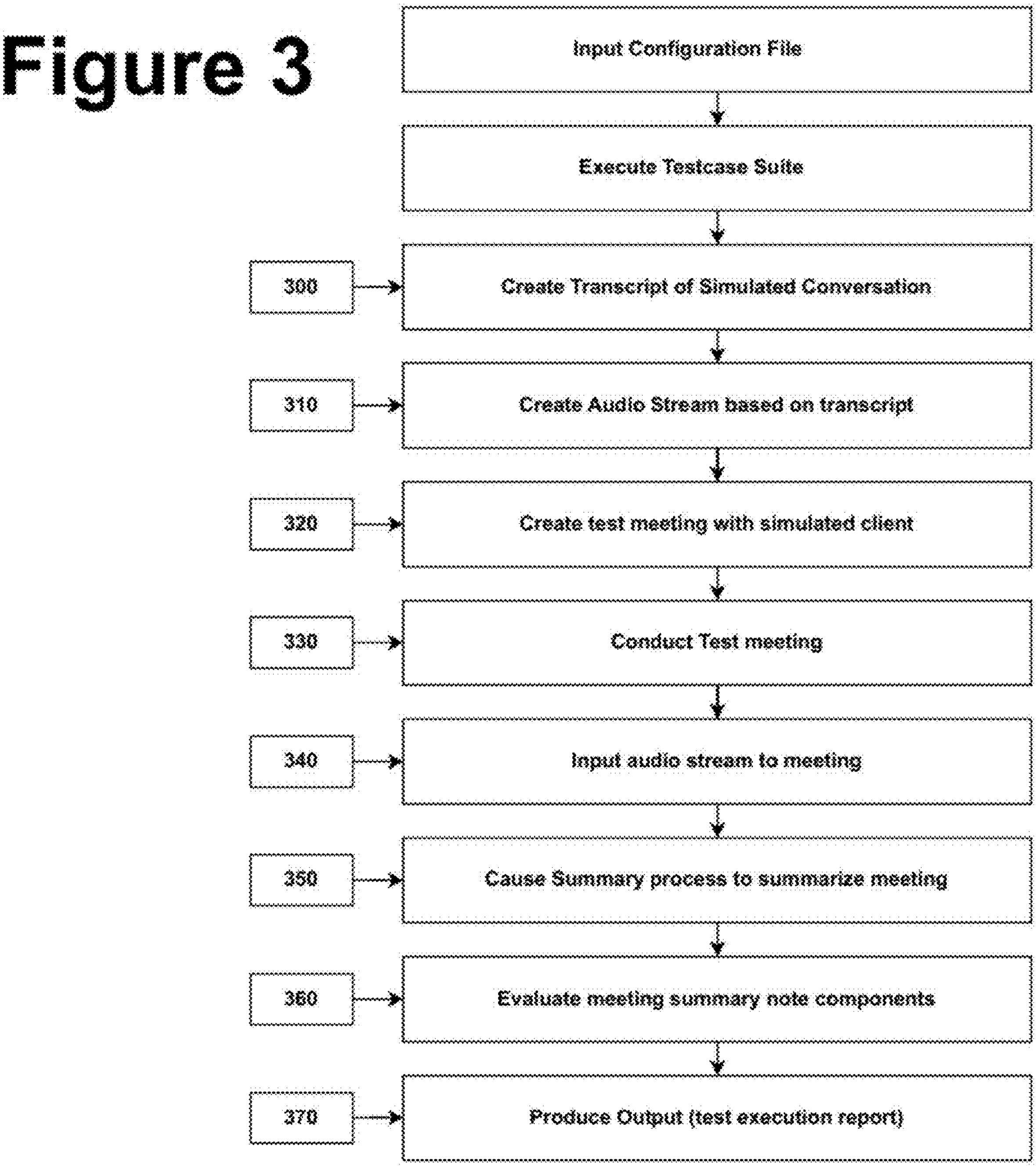
FIG. 3 is a flowchart of a method according to embodiments of the present invention.

FIG. 3 is a flowchart of a method for testing an interaction evaluation system according to embodiments of the present invention. The operations of FIG. 3 may be performed by computer systems and modules shown in FIGS. 1 and 2, but other computer systems, and other modules, may be used. As with other flowcharts herein, while an exemplary method is depicted for illustrative purposes in the flowchart of FIG. 3, it will be appreciated by those skilled in the art that features and operations from this procedure may be selectively combined with features and operations from alternative embodiments of the invention without departing from the remit of the disclosure. Further, while certain features and operations are expressly included in the flowchart of FIG. 3, it will be appreciated by those skilled in the art that not all depicted features and operations are mandatory elements, and that different embodiments may omit certain features or operations without departing from the remit of the disclosure. Accordingly, embodiments including combinations of the features and operations recited in FIG. 3 are expressly within the remit of the disclosure and do not constitute an intermediate generalization of the same.

In operation 300 a computer processor may create a text transcript of a simulated conversation. Parameters of the conversation may be defined beforehand, e.g. in a configuration file including parameters such as a main conversation topic. A prompt control process may create prompts and use them to create a text transcript based on the parameters. The prompts may be input or provided to a ML model such as an LLM which may produce the transcript as text output.

In operation 310 a computer processor may use the transcript to create one or more audio streams which are spoken-word versions of the transcript. The audio streams may include a simulated conversation among simulated participants. In one embodiment one audio stream is created with multiple participants speaking; in another embodiment one audio stream is created for each participant.

In operation 320 a computer processor may execute a process to control an e-mail and calendar application to create a new meeting with multiple participants each identified by e-mail address (e.g. specified in a configuration file), and send the meeting invitation to the e-mail addresses of the participants. The e-mail addresses may be associated with real or simulated people, but when participating in the meeting the process simulates participants. The meeting may take place and/or be created in conjunction with a communications application enabling audio and/or video communications.

In operation 330 the process may cause the communications application to start, host or conduct the meeting.

In operation 340 the process may cause the communications application to provide the audio stream(s) to the communications application, to simulate a meeting among multiple simulated participants In operation 350 the process may cause an interaction evaluation system to summarize the meeting. For example, interaction evaluation system or summary tool 20 may generate or provide notes or summaries of the meetings, action items to be taken based on those meetings, and draft e-mail messages based on the meeting. A CRM system may receive from the interaction evaluation system a summary of the meeting and output from an interaction evaluation system.

In operation 360 the process may evaluate the functioning of one or more of the e-mail application, video communications application, interaction evaluation system, and/or a CRM system. This typically occurs after the meeting ends, but need not.

In operation 370 output may be produced. For example, a report (e.g. as in Table 3) may be transmitted or displayed.

Other operations or series of operations may be used.

Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Embodiments comprising different combinations of features noted in the described embodiments, will occur to a person having ordinary skill in the art. Some elements described with respect to one embodiment may be combined with features or elements described with respect to other embodiments. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method for testing an interaction evaluation system, the method comprising:
- executing by a computer processor, a process to control an e-mail application and a communications application, the communications application hosting one or more of audio and video communications;
- the process to:
  - control the email application to automatically create a meeting with a plurality of simulated participants and send a meeting invitation to e-mail addresses of the simulated participants,
  - simulate the meeting by providing an audio stream from the process to the communications application, the audio stream comprising a simulated conversation among the plurality of simulated participants, wherein the audio stream includes a simulation of conversation for each of the plurality of simulated participants; and
- causing an interaction evaluation system to provide a summary for the meeting;
- wherein the process is to evaluate the functioning of a customer relations management (CRM) system which receives the summary of the meeting from an interaction evaluation system.

2. The method of claim 1, wherein the process is to evaluate the functioning of one or more of the e-mail application and video communications application.

3. The method of claim 1, comprising executing a prompt control process to provide to an LLM (large language model) prompts to cause the LLM to create text output, and providing the text output to a text-to-speech process to produce the audio stream.

4. The method of claim 1, comprising causing the communications application to conduct a meeting.

5. The method of claim 1, comprising a prompt control process inputting an input configuration file defining the parameters of a conversation, the prompt control process to cause an LLM to create text output, and to provide the text output to a text-to-speech process to produce the audio stream.

6. The method of claim 1, wherein at least one of the simulated participants corresponds to a browser process controlled by the process, the browser process entering input to the communications application.

7. A system for testing an interaction evaluation system, the system comprising:
- a memory; and
- a computer processor configured to execute a process to control an e-mail application and a communications application, the communications application hosting one or more of audio and video communications;
- the process to:
  - control the email application to automatically create a meeting with a plurality of simulated participants and send a meeting invitation to e-mail addresses of the simulated participants,
  - simulate the meeting by providing an audio stream from the process to the communications application, the audio stream comprising a simulated conversation among the plurality of simulated participants, wherein the audio stream includes a simulation of conversation for each of the plurality of simulated participants; and
- wherein the processor is to cause an interaction evaluation system to provide a summary for the meeting;
- wherein the process is to evaluate the functioning of a customer relations management (CRM) system which receives the summary of the meeting from an interaction evaluation system.

8. The system of claim 7, wherein the process is to evaluate the functioning of one or more of the e-mail application and video communications application.

9. The system of claim 7, wherein the processor is to execute a prompt control process to provide to an LLM (large language model) prompts to cause the LLM to create text output, and providing the text output to a text-to-speech process to produce the audio stream.

10. The system of claim 7, wherein the processor is to cause the communications application to conduct a meeting.

11. The system of claim 7, comprising a prompt control process inputting an input configuration file defining the parameters of a conversation, the prompt control process to cause an LLM to create text output, and to provide the text output to a text-to-speech process to produce the audio stream.

12. A method for operating an interaction evaluation system, the method comprising:
- executing by a computer processor, a process to control an e-mail application to create a meeting and to control and a videoconferencing application to host the meeting;
- the process to:
  - control the email application to automatically create the meeting with a plurality of simulated multiple participants and send a meeting invitation to e-mail addresses of the simulated participants,
  - simulate the meeting by inputting an audio stream from the process to the videoconferencing application, the audio stream comprising a simulated conversation among the plurality of participants, wherein the audio stream includes a simulation of conversation for each of the plurality of simulated participants; and causing an interaction evaluation system to provide a summary for the meeting hosted by the videoconference application;

wherein the process is to evaluate the functioning of a customer relations management (CRM) system which receives the summary of the meeting from an interaction evaluation system.

13. The method of claim 12, wherein the process is to evaluate the functioning of one or more of the e-mail application and videoconferencing application.

14. The method of claim 12, comprising executing a prompt generation process to provide to an LLM (large language model) prompts to cause the LLM to create text output, and providing the text output to a text-to-speech process to produce the audio stream.

15. The method of claim 12, comprising a prompt control process inputting an input configuration file defining the parameters of a conversation, the prompt control process to cause an LLM to create text output, and to provide the text output to a text-to-speech process to produce the audio stream.

* * * * *